United States Patent
Aoki et al.

(10) Patent No.: US 6,992,578 B2
(45) Date of Patent: Jan. 31, 2006

(54) DISPLAY SYSTEM MOUNTED IN AUTOMOBILE VEHICLE

(75) Inventors: Kunimitsu Aoki, Shizuoka (JP); Go Nakamura, Shizuoka (JP); Yoshihide Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 103 days.

(21) Appl. No.: 10/691,498

(22) Filed: Oct. 24, 2003

(65) Prior Publication Data
US 2004/0095651 A1   May 20, 2004

(30) Foreign Application Priority Data
Nov. 20, 2002   (JP)   ............................. 2002-336082

(51) Int. Cl.
*B60Q 1/00*   (2006.01)
(52) U.S. Cl. ........................... 340/525; 340/461; 345/9
(58) Field of Classification Search ................ 340/525, 340/980, 461; 345/7, 8, 9; 349/11; 73/1.42; 352/207; 359/13, 14, 630–633
See application file for complete search history.

(56) References Cited

U.S. PATENT DOCUMENTS

| | | | | |
|---|---|---|---|---|
| 4,886,328 A | * | 12/1989 | Iino | ............................ 340/980 |
| 5,144,289 A | * | 9/1992 | Ohshima | .................... 525/314 |
| H1109 H | * | 10/1992 | Roberts et al. | .............. 534/557 |
| 5,422,812 A | * | 6/1995 | Knoll et al. | ................. 701/209 |
| 5,497,271 A | * | 3/1996 | Mulvanny et al. | ........... 359/631 |
| 5,657,163 A | | 8/1997 | Wu et al. | .................... 359/630 |
| 6,750,832 B1 | * | 6/2004 | Kleinschmidt | ................. 345/7 |

FOREIGN PATENT DOCUMENTS

| | | |
|---|---|---|
| DE | 199 30 710 A1 | 1/2001 |
| DE | 101 35 986 A1 | 2/2002 |
| DE | 694 30 506 T2 | 10/2002 |
| DE | 102 26 896 A1 | 2/2003 |
| JP | 64-35139 | 3/1989 |
| JP | 6-6987 | 2/1994 |

* cited by examiner

*Primary Examiner*—Jeffery Hofsass
*Assistant Examiner*—Jennifer Stone
(74) *Attorney, Agent, or Firm*—Armstrong, Kratz, Quintos, Hanson & Brooks, LLP

(57) ABSTRACT

A display system has a display unit and a reflector which are disposed in an instrument panel of an automotive vehicle. The display unit emits an image that is reflected by the reflector, and the image is projected on a windshield of the vehicle via an opening of the instrument panel. The display system superposes the image on a foreground seen from the vehicle such that a diver of the vehicle can recognize the superposed image and the foreground via the windshield simultaneously. The display system includes a shutter device disposed between the display unit and the opening. The shutter device is transformable to pass indication beams of the emitted image through the opening in conformity with a size of the emitted image.

9 Claims, 13 Drawing Sheets

DISPLAY SYSTEM MOUNTED IN AUTOMOBILE VEHICLE

BACKGROUND OF THE INVENTION

1. Field of the Invention

The present invention relates to a display system mounted in an automobile vehicle. Particularly, the display system has a display unit and a reflector which are disposed in an instrument panel of the automotive vehicle. The display unit emits an image that is reflected by the reflector, and the image is projected on a windshield of the vehicle via an opening of the instrument panel. The display system superposes the image on a foreground seen from the vehicle such that a driver of the vehicle can see the superposed image and the foreground via the windshield simultaneously.

2. Related Art

Recently, a driver needs information increased in amount and in kind during operation of an automobile vehicle. A meter unit mounted on an instrument panel of the vehicle does not have a space enough to indicate all the information. Therefore, a projector-type display unit called as a head-up display (HUD) has been adopted so that an excess amount of the information can be projected on a windshield of the vehicle as a virtual image. The virtual image is superposed on a foreground which is visible through the windshield.

The projector-type display unit reflects an image projected by a projector on the windshield so that a driver can see the image. However, external rays such as sunlight enter the display unit through the windshield to reach the projector. Disadvantageously, infrared rays included in the external rays heat the projector, causing a problem that the heating and heat accumulation of the projector decreases a usage life of the projector.

To solve the problem, a prior-art head-up display unit has an infrared ray reflector (filter) disposed across a path of external rays to prevent breakdown of the indicator due to heating thereof. Such a prior-art head-up display unit is disclosed in Japanese Utility Model No. 64-35139 (Pages 4, 5, and FIG. 1).

FIG. 31 shows a general configuration of a conventional head-up display unit for a vehicle. Generally, such a head-up display unit is disposed in an instrument panel 1 arranged within a limited vehicle space. A virtual image S visible through a windshield 3 is to be apart more than 2 or 3 meters from a driver's eye I. Therefore, the head-up display unit has a reflector 4 like a concave mirror or a flat mirror, or a lens may be provided in place of the reflector to extend the distance from the virtual image to the driver's eye. However, external rays F such as sunlight enter the instrument panel 1 through the windshield 3 to reach a display device 5, causing the problem described above.

The head-up type display system indicates normal information including speed, telltale, and navigation. The head-up type display system also indicates an image of a foreground seen from the vehicle, which is taken by an infrared ray camera during the night.

The normal information of the display system is indicated desirably near a center of a driver's sighting angle. Furthermore, the indication must be positioned to have no ill effect on a normal vehicle operation for the driver. Moreover, the size of the indication (sighting angle) must be determined to be easily recognized but must not be too large to prevent the driver from recognizing a foreground of the driver's view.

The normal information is indicated with numerals, letters, illustrations, or telltales, while the camera-taken image is a moving picture in which a distant object is smaller than a nearer one. Therefore, the camera-taken image is necessary to be indicated with an increased scale to provide a desirable scale image to the driver, so that the image is larger than the indication of the normal information. That is, the head-up type display system has an optical system to enlarge the image as well as a function to alternatively indicate the normal information and the camera-taken image.

The head-up type display system needs to have a reflector 4 larger than a conventional one to enlarge a projected image. However, the larger reflector 4 collects more external rays that reach a display unit 5. Therefore, the conventional heat-absorbing or heat-reflecting element may not prevent undesirable heating of the display unit 5. A filter described in Japanese Utility Model No. 64-35139 or a hologram reflecting specified wave rays is not sufficient for preventing the heating of the display unit 5 because of the larger reflector 4.

SUMMARY OF THE INVENTION

In view of the above-mentioned disadvantage, an object of the present invention is to provide a display system to solve the problem that external rays reach a display unit to heat up it.

For achieving the object, an aspect of the invention is a display system having a display unit and a reflector which are disposed in an instrument panel of an automotive vehicle. The display unit emits an image that is reflected by the reflector, and the image is projected on a windshield of the vehicle via an opening of the instrument panel. The display system superposing the image on a foreground seen from the vehicle such that a diver of the vehicle can recognize the superposed image and the foreground via the windshield simultaneously. The display system includes a shutter device disposed between the display unit and the opening, and the shutter device is transformable to pass indication beams of the emitted image through the opening in conformity with a size of the emitted image.

Thus, the shutter device of the display system passes the indication beams of the emitted image through the opening in conformity with a size of the emitted image, so that undesirable external rays which reach the display unit can be adjusted in relation to the indication image. Even when a larger reflector is provided to engage the virtual image seen through the windshield, the shutter device can adjust the amount of rays passing through it, preventing breakdown due to heating of display unit.

Preferably, the image emitted from the display unit is obtained by an infrared ray camera that takes a foreground seen from the vehicle particularly during the night, and the shutter device is transformable so that the image taken by the infrared ray camera becomes larger than during a normal operation of the display unit.

Thus, by the shutter device, the image taken during the daytime can be smaller than during the night, so that the external rays reach less the display unit during the daytime. This prevents breakdown due to heating of display unit.

Preferably, the shutter device has a plurality of shutting members to pass the indication beams of the emitted image through the opening in conformity with the size of the emitted image.

Thus, the shutter device can shut rays unnecessary for the indication of the emitted image, decreasing undesirable external rays that reach the display unit.

Preferably, the shutter device is a sliding shutter that opens and closes to pass the indication beams of the emitted image through the opening in conformity with the size of the emitted image.

Furthermore, the shutter can stop at a plurality of selected intermediate positions, so that the opening can be varied in various shapes and sizes, thereby varying the virtual image in profile and size.

Preferably, the shutter device prevents external rays from reaching the display unit through the opening when the display unit is not in use.

Preferably, the shutter device is disposed to be opposed to a reflection face of the reflector.

Preferably, the reflector reflects visible rays and passes infrared rays. This surely prevents breakdown due to heating of display unit.

Preferably, a plurality of the reflectors are provided across an optical path between the display unit and the opening. Thus, the reflectors can effectively prevents infrared rays from reaching the display unit when external rays reach the reflector through the opening of the instrument panel. This surely prevents breakdown due to heating of display unit.

Preferably, the reflector primarily reflects visible rays having wavelengths of colors of the image emitted from the display unit. This surely prevents breakdown due to heating of display unit.

DETAILED DESCRIPTION OF THE PREFERRED EMBODIMENTS

Embodiments of a display system according to the present invention will be discussed hereinafter. Note that a constitutional element identical with or corresponding to one having been described in the prior art is designated by the same reference as in the prior art and will not be discussed in detail again.

First Embodiment

FIGS. 1 to 9 show a first embodiment of a display system according to the present invention.

Figure 1:
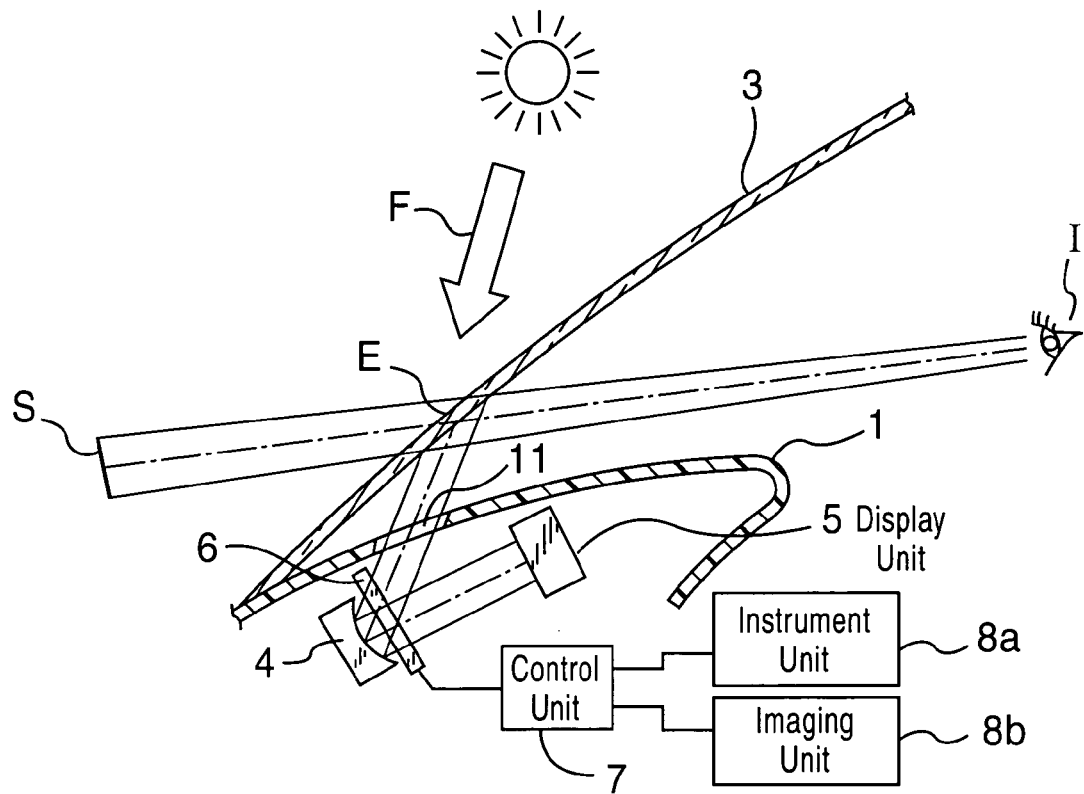
FIG. 1 is a general constitutional view showing a first embodiment of a display system according to the present invention.

As illustrated in FIG. 1, the display system has a reflector 4 and a display unit (display device) 5 which are mounted in an instrument panel 1 of a vehicle. The display device is a light-emitting device (for example, a field emission display, a fluorescent indicator, or an electro-luminescence display) a liquid-crystal display with a back illumination light, or the like. The display unit 5 indicates an image which is reflected by the reflector 4 to be projected on a projecting area E on a windshield 3 of the vehicle through an opening 11 of the instrument panel. A virtual one S of the projected image is superposed on a foreground seen from the vehicle when they are observed through the windshield 3 from an eye I of a driver.

The display system further has a shutter unit (shutter device) 6 that is disposed on an optical path between the display unit 5 and the opening 11. The shutter unit 6 can change its window profile as corresponded to an indication object that is displayed by the display unit 5 to be projected in the projection area E.

The display system is electrically connected to the display unit 5 and the shutter unit 6 and has a control unit 7 to control an image indicated by the display unit 5 and the movement of the shutter unit 6. The control unit 7 also electrically connects to a speed meter, an instrument unit 8a like a navigation device, an imaging unit 8b having an infrared ray camera, etc. The control unit 7 indicates the image in the display unit 5 based on data output from the electrically connected devices. Particularly, the control unit 7 controls the shutter unit 6 so as to pass indication beams corresponding to an indication object.

Figure 2:
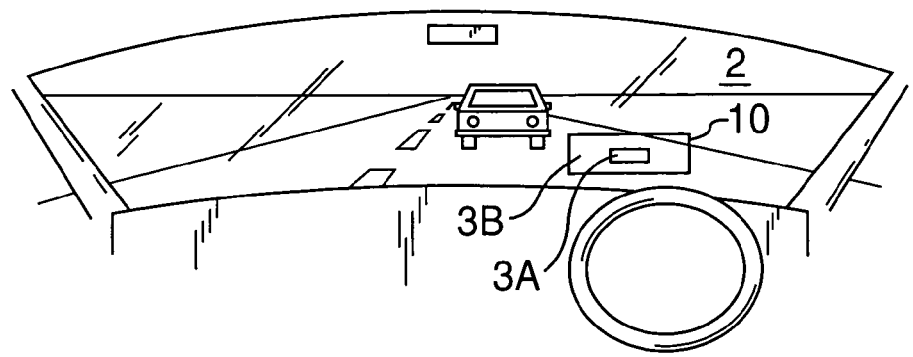
FIG. 2 is a general view showing an indication example provided by the display system of FIG. 1.

FIG. 2 is a general view showing an indication example provided by the display system of FIG. 1. Referring to FIG. 2, an operation of the control unit 7 of this embodiment will be discussed hereinafter. The control unit 7 can indicate an image in the projecting area E such that the image becomes alternatively in a smaller normal indication pattern 3A and in a larger camera-taken image 3B.

Figure 3A:
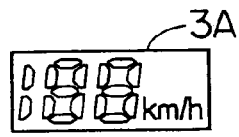
FIG. 3A is a view showing a normal indication.
Figure 3B:
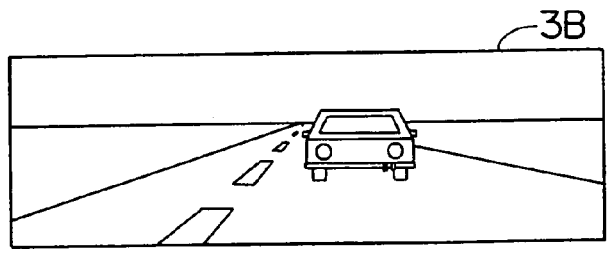
FIG. 3B is a view showing an image indication of a camera-taken image.

As illustrated in FIG. 3A, the normal indication pattern 3A shows a vehicle speed and has a brightness for a driver enough to recognize the indication even when external rays F such as sun beams and rays reflected from a road or snow surface are present. Meanwhile, as illustrated in FIG. 3B, the image indication pattern 3B is an image of a foreground of a driver's view which is taken by the imaging unit 8b.

Figure 4:
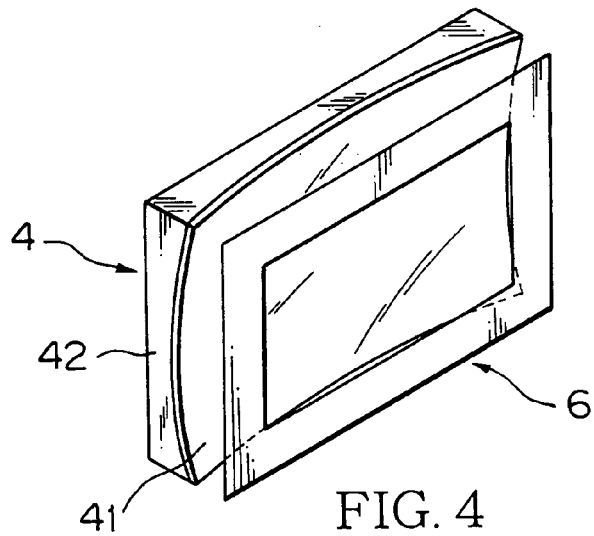
FIG. 4 is a general perspective view showing a shutter unit and a reflector which are positioned desirably relative to each other.

As illustrated in FIG. 4, the reflector 4 has a mirror 41 passing infrared rays and a mirror holder 42 to hold the mirror 41. The mirror 41 is called as a cold mirror hereinafter. The cold mirror 41 has a concave surface for enlarging an image indicated by the display unit 5, and the concave surface is spherical or otherwise curved. The shutter unit 6 is opposed to the enlarging mirror 41 of the reflector 4. A half mirror may be applied in place of the cold mirror 41 of this embodiment.

The cold mirror 41 reflects visible rays but passes infrared rays through it. Thus, infrared rays of external rays F pass through the reflector 4 when the external rays F reach the reflector 4 via the opening 11 of the instrument panel 1. Thus, the provision of the cold mirror 41 of the reflector 4 prevents the display unit 5 from being damaged due to condensed rays of the external rays F.

Figure 5:
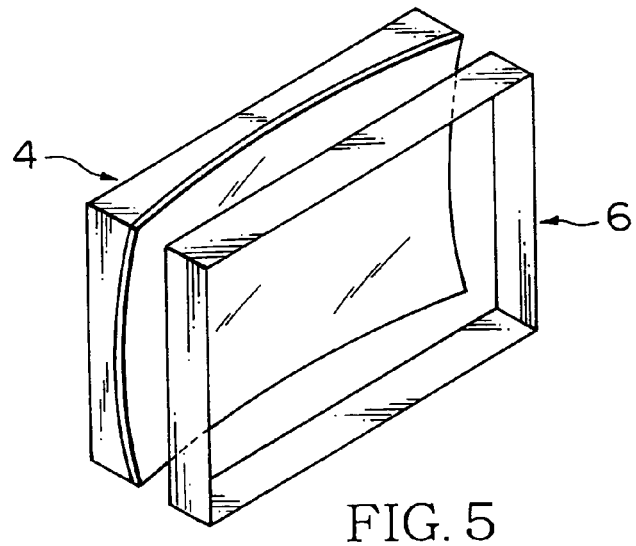
FIG. 5 is a general perspective view showing an operational state of the shutter unit.

In the first embodiment, as illustrated in FIG. 5, the shutter unit 6 has four shutting members pivotable to change a frame size that adjusts an indication part of the image emitted from the display unit 5 so that the part is indicated in the indication area E. This operation will be discussed in detail hereinafter.

Figure 6:
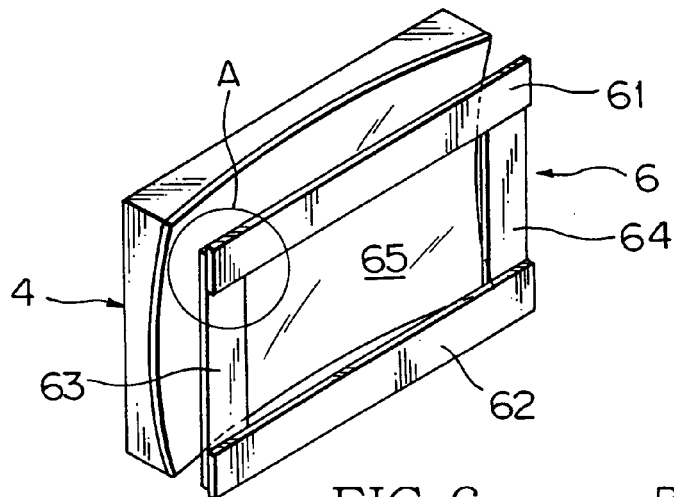
FIG. 6 is a general perspective view showing an operational state of the shutter unit, in which the shutter unit is in a folded state.
Figure 7:
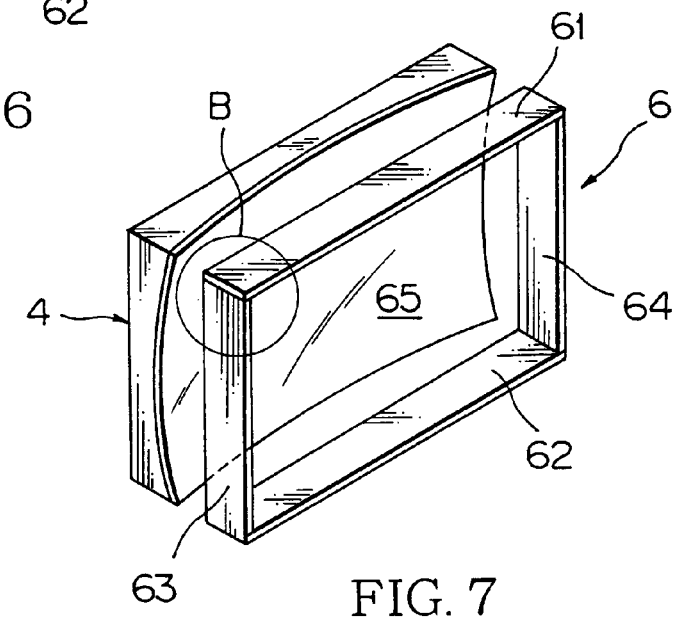
FIG. 7 is a general perspective view showing an operational state of the shutter unit, in which the shutter unit is in an opened state.

The shutter unit 6, as illustrated in FIGS. 6 and 7, has four shutter plates 61 to 64 each defined by an elongated rectangular plate. FIG. 6 shows a state where the elongated plates are folded such that the shutter plates 61 and 62 are positioned outside of the shutter plates 63 and 64. The folded shutter plates 61 to 64 define an inside window 65 through which indication beams emitted from the display unit 5 can pass.

Figure 8:
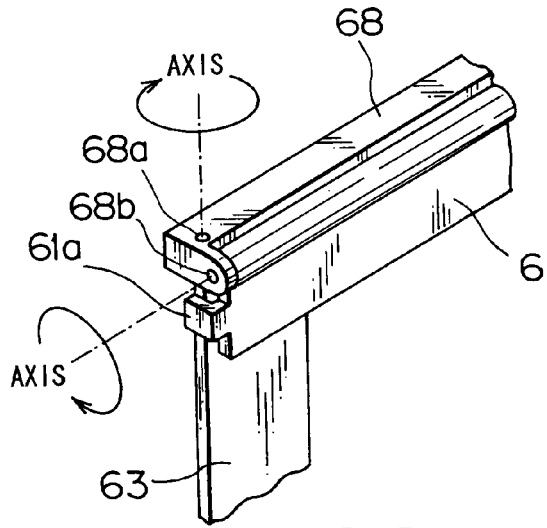
FIG. 8 is an enlarged view of an encircled part A of FIG. 6.
Figure 9:
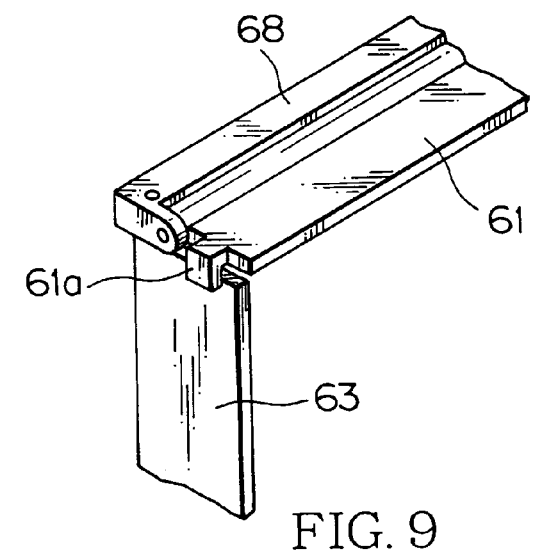
FIG. 9 is an enlarged view of an encircled part B of FIG. 7.

As illustrated in FIGS. 8 and 9, the shutter plate 61 pivots together with a shaft 68b turnably supported by a fixed frame 68, while the shutter plate 63 pivots with a shaft 68a turnably supported by the fixed frame 68. The shutter plate 61 has a stopper piece 61a at each end thereof for contacting the shutter plate 63 or 64. The shutter plates 62 and 64 move in the same way as the shutter plates 61 and 63.

The shutter plate 64 further has a driving part (not shown) to move the shafts 68a and 68b. The driving part operates in response to control signals provided from the control unit 7. For example, in a state that the shutter plates 61 and 62 are folded to partially cover the shutter plates 63 and 64, an driving signal provided from the control unit 7 moves the shaft 68b so that the shutter plates 61 and 64 become substantially perpendicular to the reflector 4. Thereby, the shutter plates 61 and 62 pivot until stoppers engage with the shutter plates 63 and 64, so that the shutter plates 61 to 64 of the shutter unit 6 become in an open state.

The shutter plates 61 to 64, which are in the folded state, cover a predetermined inside area of the cold mirror 41 (reflector 4) near a periphery of the cold mirror 41. Meanwhile, the shutter plates 61 to 64, which are in the open state, cover no area of the cold mirror 41 (reflector 4). Thus, the window 65 of the shutter unit 6 is smaller in the folded state than in the open state.

In the folded state of the shutter unit 6, indication beams pass through the shutter unit 6 to reach a middle area of the cold mirror 41 which is not covered by the shutter plates 61 to 64. Meanwhile, in the open state of the shutter unit 6, indication beams pass through the shutter unit 6 to reach the whole front surface of the cold mirror 41 which is not limited by the shutter plates 61 to 64.

The window 65 defined by the shutter plates 61 to 64 of the shutter unit 6 varies, as described above, so that a projected image on the projecting area E varies with the shape of the window 65 which is defined by the shutter unit 6 passing indication beams of the display unit 5.

The normal indication pattern 3A is smaller than the image indication pattern 3B. The display system of the first embodiment controls the shutter unit 6 to become in the folded state when the normal indication pattern 3A is indicated and to become in the open state when the image indication pattern 3B is indicated.

That is, the display system moves the shutter unit 6 in the folded state and switches the display unit 5 to indicate the normal indication pattern 3A as shown FIG. 3A. Furthermore, the display system moves the shutter unit 6 in the open state and switches the display unit 5 to indicate the image indication pattern 3B on the projecting area E as shown in FIG. 3B.

As discussed above, the display system of the first embodiment has the shutter unit 6 of which the window 65 becomes smaller when the normal indication pattern 3A is selected since the shutter unit 6 is in the folded state. This decreases external rays F passing through the opening 11 of the instrument panel 1 to reach the display unit 5 via the reflector 4.

Thus, even when a larger reflector 4 is applied to the display system, external rays F condensed on the display unit 5 can be decreased by the shutter unit, preventing a damage of the display unit 5 due to heating thereof.

Moreover, the display system may cooperate with a night vision unit to provide a clear sight for the driver during the night or the like to operate the vehicle safely. In such cases, the image indication pattern 3B is indicated in a larger scale, but external rays F have a less light quantity during the night, so that the larger reflector 4 does not cause a damage of the display unit 5 due to heating thereof.

In addition, the cold mirror 41 of the reflector 4 passes almost all of infrared rays of the external rays F entering through the shutter unit 6, so that the external rays F do not heat up the display unit 5.

Second Embodiment

In the first embodiment discussed above, the shutter unit 6 has the pivotable four shutter plates 61 to 64. A second embodiment of the present invention will be discussed with reference to FIG. 10 which is a general configuration showing an operation of a shutter unit of the second embodiment. The shutter unit has slidable shutting members 61 to 64.

Figure 10:
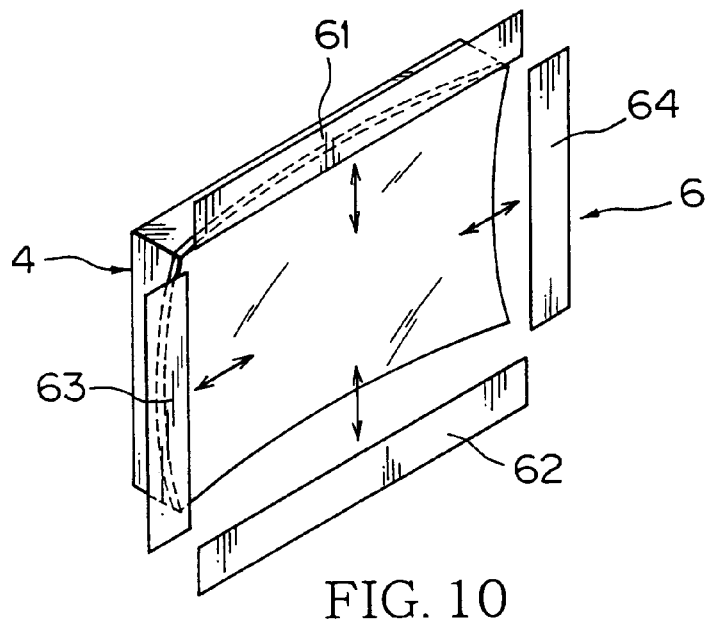
FIG. 10 is a general perspective view showing an operational state of a shutter unit of a second embodiment according to the present invention.
Figure 12:
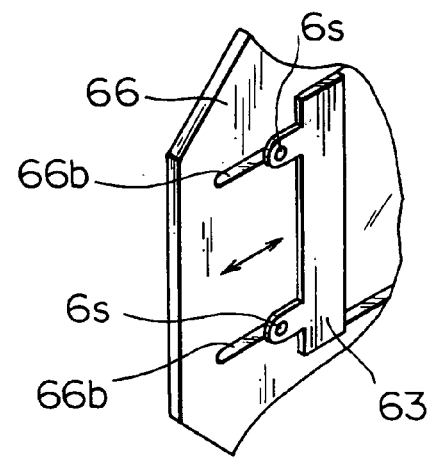
FIG. 12 is an enlarged view of an encircled part C of FIG. 11.
Figure 11:
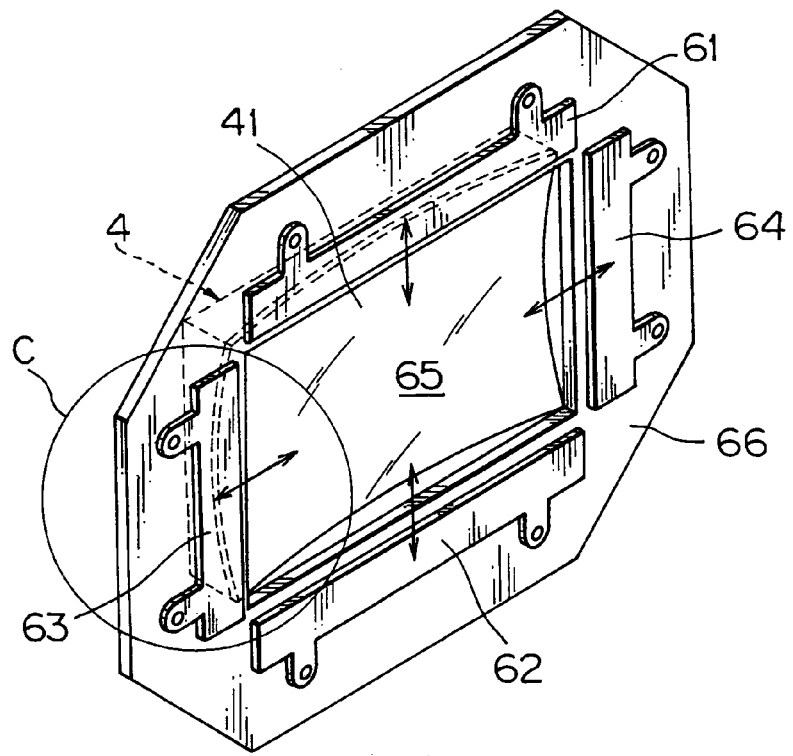
FIG. 11 is a perspective view showing an example of the shutter unit of FIG. 10.

FIG. 11 is a perspective view showing an example of the shutter unit of FIG. 10, and FIG. 12 is an enlarged view of an encircled part C of FIG. 11. Note that the general configuration of the second embodiment is similar to that of the first embodiment. A constitutional element identical with or corresponding to one have been described in the first embodiment is designated by the same reference as in the first embodiment and will not be discussed in detail again.

As illustrated in FIG. 11, the shutter unit 6 has four shutter plates 61 to 64 each defined in an elongated rectangular pate associated with each side of the reflector 4. Each of the shutter plates 61 to 64 is slidably attached to a frame plate 66 provided with a central window 65 having the same size as the reflector 4 to pass its indication beams. The shutter plates 61 to 64 slide between a first state that the shutter plates 61 to 64 open fully the window 65 (FIG. 11) and a second state that the shutter plates 61 to 64 partially cover the window 65 (not shown)

As illustrated in FIG. 12, the frame plate 66 has a plurality of guide slits 66b each slidingly receiving a sliding shaft 6s fixed to each of the shutter plates 61 to 64. The sliding shafts 6s are moved by a driving unit (not shown) so that the shutter plates 61 to 64 move between the full open state and the partially covered state.

In the second embodiment, when the shutter plates 61 to 64 have not been extended into the window 65, all the indication beams provided from the display unit 5 pass through the window 65. Meanwhile, when the shutter plates 61 to 64 have been extended into the window 65, the indication beams are partially shut out by the shutter plates 61 to 64. In the present invention, the shutter plates 61 to 64 may be normally extended into the window 65 and may be moved inward or outward from the normal state to vary the size of the window 65.

In the extended state of the shutter unit 6, the indication beams pass through the shutter unit 6 to reach a middle area of the cold mirror 41 which is not covered by the shutter plates 61 to 64. Meanwhile, in the not extended state of the shutter unit 6, the indication beams pass through the shutter unit 6 to reach the whole front surface of the cold mirror 41 that is not limited by the shutter plates 61 to 64.

The window 65 defined by the shutter plates 61 to 64 of the shutter unit 6 varies, as described above, so that a projected image on the projecting area E varies with the shape of the window 65 which is defined by the shutter unit 6 passing the indication beams of the display unit 5.

The display system of the second embodiment controls the shutter unit 6 to become in the extended state when the normal indication pattern 3A is indicated and to become in the not extended state when the image indication pattern 3B is indicated.

That is, the display system slides the shutter plates 61 to 64 to transform the shutter unit 6 in the extended state and switches the display unit 5 to indicate the normal indication pattern 3A as shown FIG. 3A. Meanwhile, the display system slides the shutter plates 61 to 64 to transform the shutter unit 6 in the not extended state and switches the display unit 5 to indicate the image indication pattern 3B on the projecting area E as shown FIG. 3B for operation of the vehicle during the night.

As discussed above, the display system of the second embodiment has the shutter unit 6 of which the window 65 becomes smaller when the normal indication pattern 3A is selected since the shutter unit 6 is in the extended state. This decreases external rays F passing through the opening 11 of the instrument panel 1 to reach the display unit 5 via the reflector 4. Accordingly, the second embodiment has an operational effect similar to the first embodiment.

Figure 13:
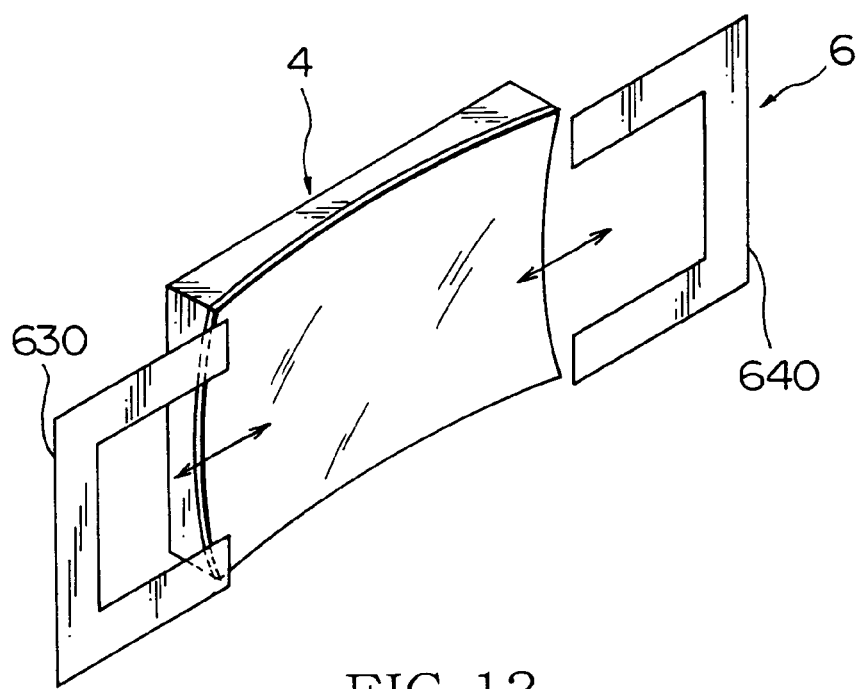
FIG. 13 is a general perspective view showing an operational state of another shutter unit of the second embodiment according to the present invention.

Regarding the second embodiment, the shutter plates 61 to 64 may be modified in number and shape such that the shape of the window 65 of the shutter unit 6 corresponds to a projected image having a desirable profile on the projecting area E. A modified example of the second embodiment is shown in FIG. 13 which illustrates a general operation of the modified example. The example has two shutter plates 630 and 640 that slide to vary a window 65.

Figure 14:
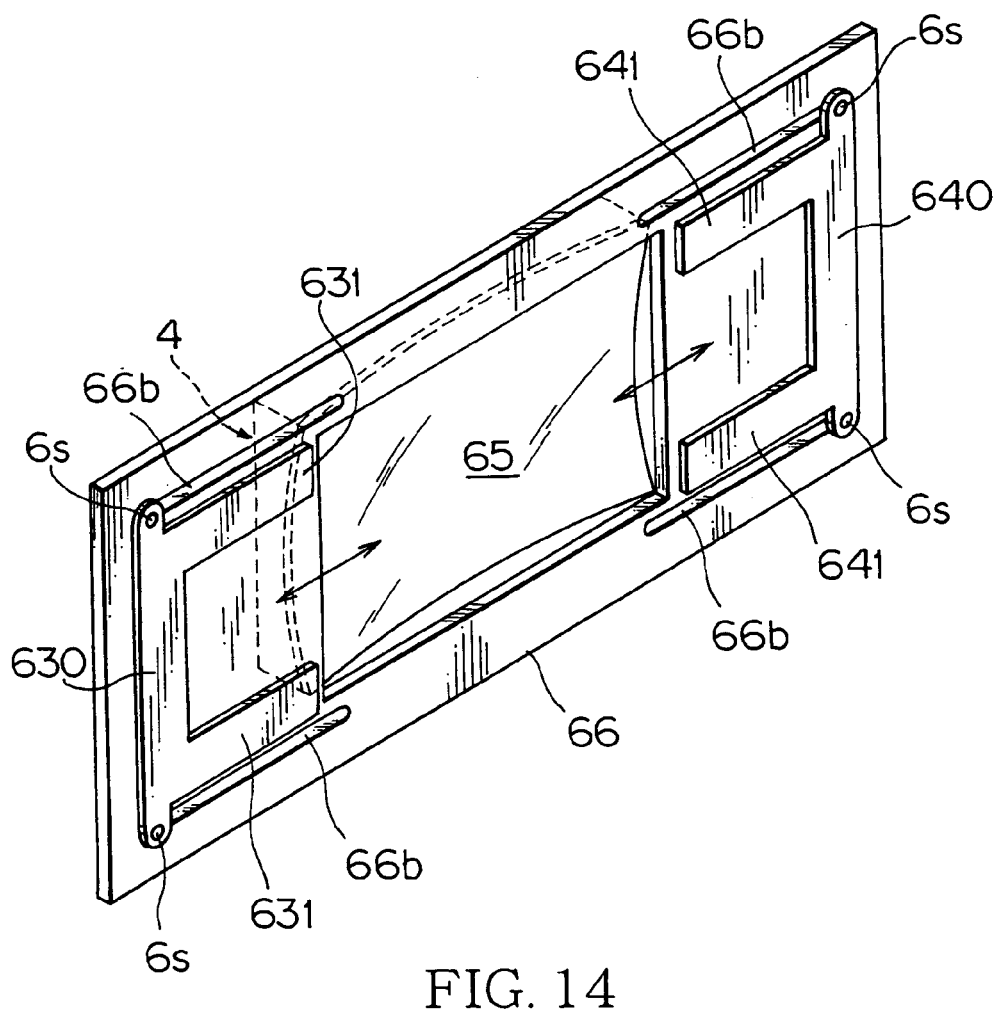
FIG. 14 is a perspective view showing an example of the shutter unit of FIG. 13.

FIG. 14 is a perspective view showing a shutter unit of the display system of FIG. 13. The shutter unit has the shutter plates 630 and 640 each defined in a U-shape. The shutter plates 630 and 640 are each positioned at a left or right side of a frame plate 66 when the image indication pattern 3B is indicated. When the image indication pattern 3B is selected, extended portions 631 and 641 of the shutter plates 630 and 640 partially cover a peripheral area of the window 65 of the frame plate 66, that is, a front surface of the cold mirror. The shutter plates 630 and 640 each have sliding shafts 6s each sliding along a guide slit 66b defined in the frame plate 66 to vary the shape of the window 65.

As discussed above, the modified shutter unit 6 of the second embodiment has the shutter plates 630 and 640 of which the extended portions 631 and 641 can make the window 65 smaller. This decreases external rays F passing through the opening 11 of the instrument panel 1 to reach the display unit 5 via the reflector 4. Accordingly, the second embodiment has an operational effect similar to the first embodiment.

Third Embodiment

Next, a third embodiment of the present invention will be discussed. The first and second embodiment each have the shutter unit 6 opposed to and adjacent to the front surface of the reflector 4. Meanwhile, the third embodiment has a shutter unit 6 disposed to be opposed to and adjacent to a screen of the display unit 5.

FIGS. 15 to 19 show the third embodiment of a display system according to the present invention. A constitutional element identical with or corresponding to one having been described in the first or second embodiment is designated by the same reference as in the first or second embodiment and will not be discussed in detail again.

Figure 15:
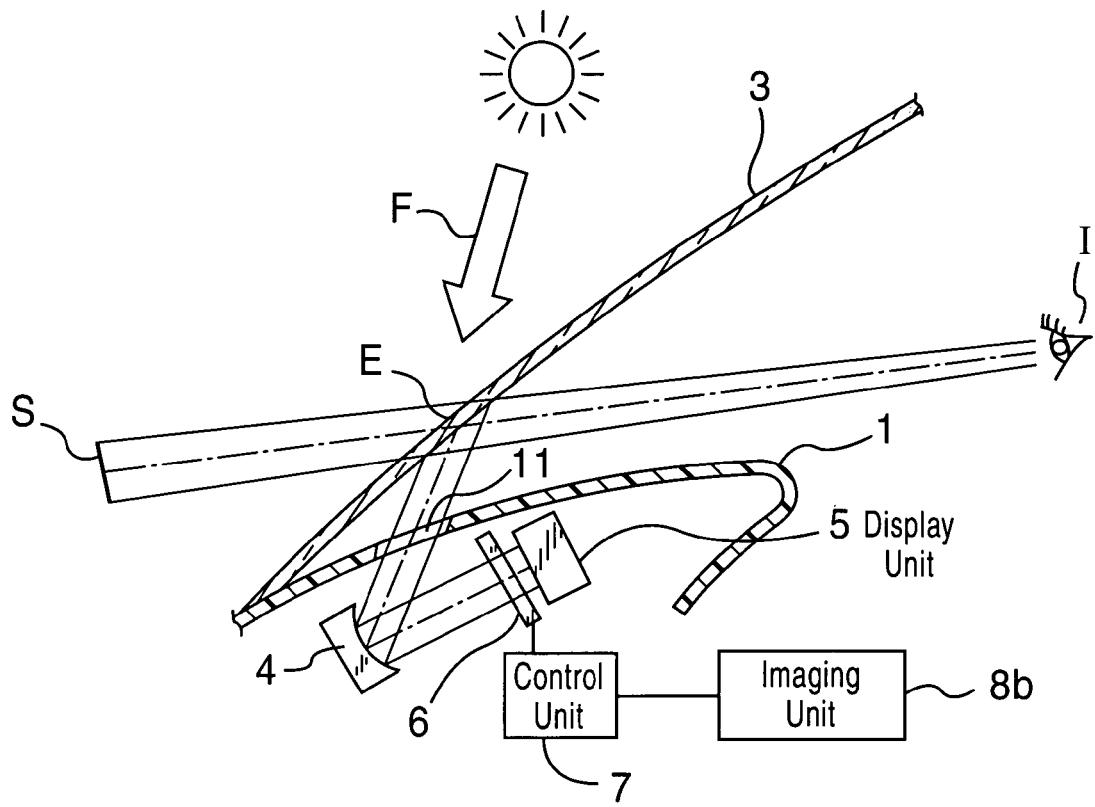
FIG. 15 is a general constitutional view showing a third embodiment of a display system according to the present invention.

Like the first and second embodiment, as illustrated in FIG. 15, the display system has a reflector 4 and a display unit (display device) 5 which are mounted in an instrument panel 1 of a vehicle. The display device is a light-emitting device, a liquid-crystal display with a back illumination light, or the like. The display unit 5 indicates an image that is reflected by the reflector 4 to be projected on a projecting area E on a windshield 3 of the vehicle through an opening 11 of the instrument panel. A virtual one S of the projected image is superposed on a foreground seen from the vehicle when they are observed through the windshield 3 from an eye I of a driver.

The display system further has a shutter unit (shutter device) 6 that is disposed across an optical path between the display unit 5 and the opening 11. The shutter unit 6 can change its front window in relation to an indication object that is displayed by the display unit 5 to be projected in the projection area E. The display system also has a control unit 7 to control an image indicated by the display unit 5 and the movement of the shutter unit 6.

Regarding the third embodiment, an operation of the display system will be discussed, in which the control unit 7 is electrically connected to an imaging unit 8b, and an image is indicated on the projecting area E. The image is a camera-taken image 3B shown in FIG. 3B, which is a foreground seen from a vehicle and is taken by an infrared ray camera.

The shutter unit 6, as illustrated in FIGS. 16 to 19, has a shutter 60, a pair of guide slits 66b, and a frame plate 66 formed with an window 65 which passes indication beams emitted from the display unit 5 in an open state of the shutter 60. A pair of sliding shafts 6s each move along one of the guide slits 66b. Each sliding shaft 6s is fixed on the shutter 60 and receives turnably an end of one of arms 67a, 67b. The other end of the arm is turnably connected to the frame plate 66.

The arms 67a, 67b are turnably connected to each other at central portions thereof. The arm 67b is operably connected to a crank arm 67c. In turn, the crank arm 67c is operably connected to a crank lever 67e secured to an output shaft of a driving gear mechanism 67d driven by a one-direction rotating motor 67f. The crank lever 67e moves with the rotation of the crank arm 67c to open or close the shutter 60.

Figure 16:
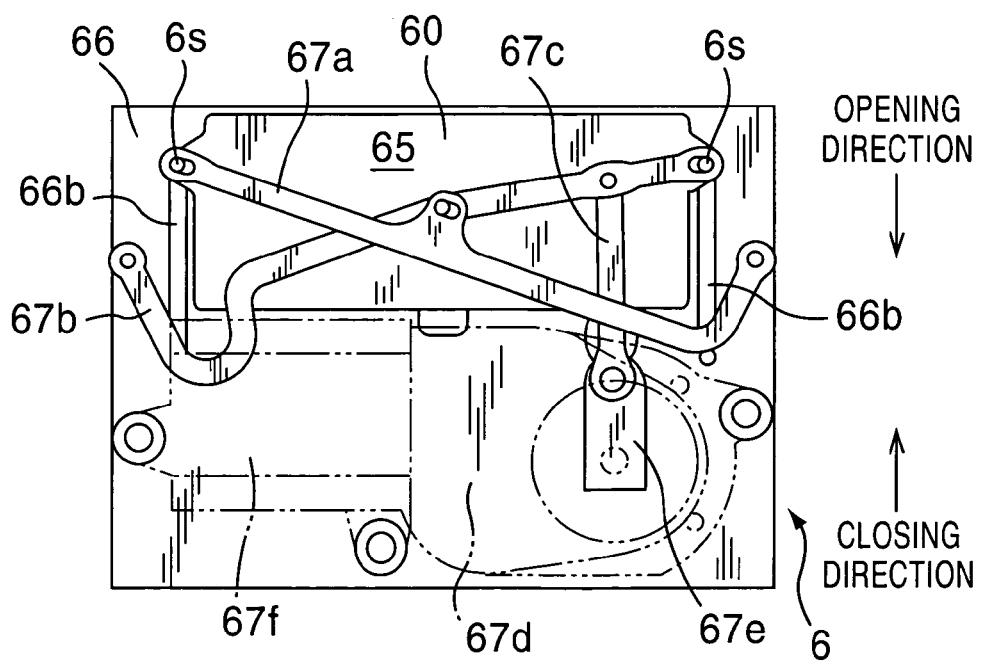
FIG. 16 is a general explanatory view showing a closed state of a shutter unit.
Figure 17:
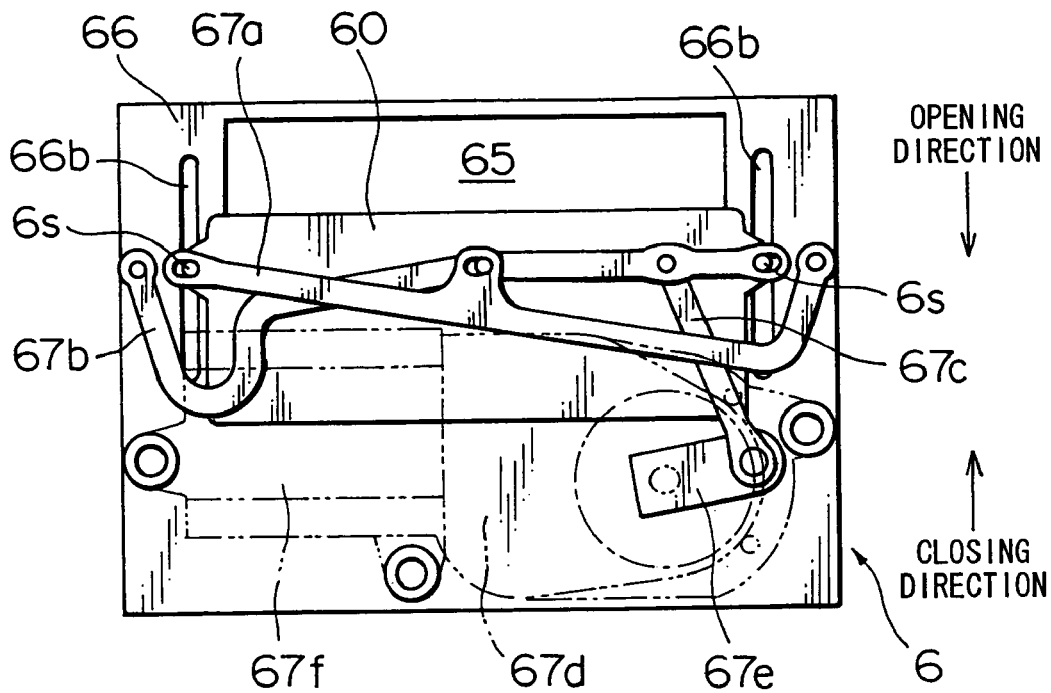
FIG. 17 is a general explanatory view showing a transition state of the shutter unit to open the shutter unit.

Next, an operation of the shutter unit 6 will be discussed. In FIG. 16, the shutter 60 is in the closed state of the window 65, and the motor 67f begins to rotate. In turn, the gear mechanism 67d moves the crank arm 67c via the crank lever 67e toward the open state. Thereby, the arms 67a, 67b are driven to move the shutter 60 toward the open state to partially open the window 65 of the frame plate 66 as illustrated in FIG. 17.

Figure 18:
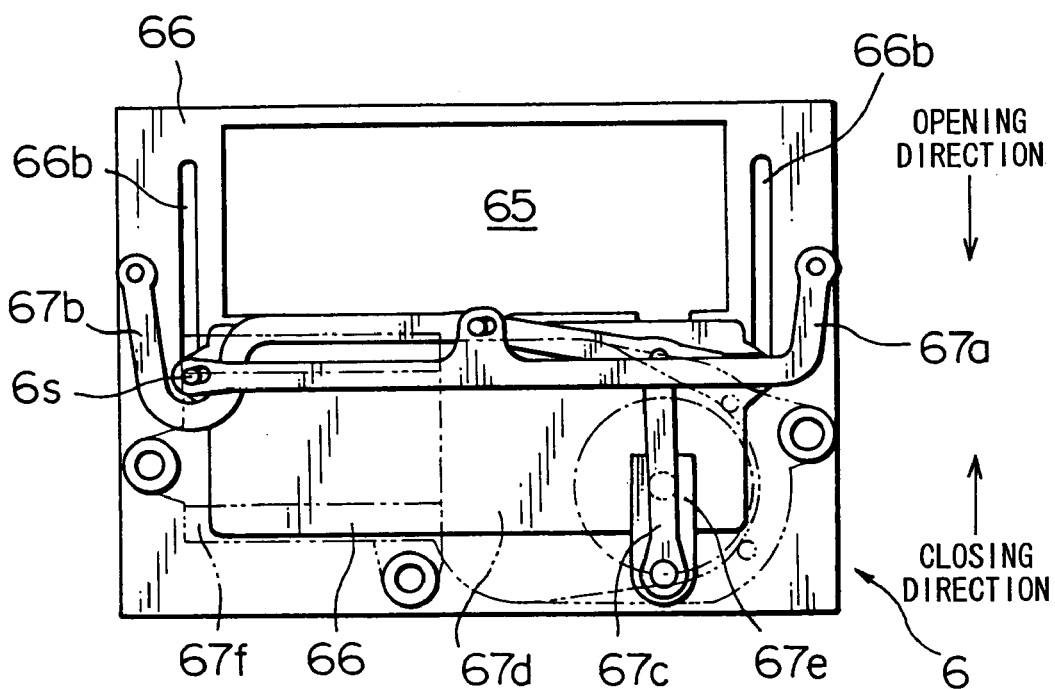
FIG. 18 is a general explanatory view showing an open state of the shutter unit.

A further rotation of the motor 67f fully exposes the window 65 of the frame plate 66 as illustrated in FIG. 18. At the maximum open state of the window 65, the motor 67f stops to indicate the image indication pattern 3B described above.

When the driver of the vehicle ceases the image indication pattern 3B, the motor 67f is rotated again so that the crank lever 67e moves the crank arm 67c. In turn, the arms 67a and 67b move, so that the shutter 60 moves toward the closed position. The motor 67f rotates until the shutter 60 becomes in the closed state shown in FIG. 16.

The shutter unit 6 of the third embodiment rotates the motor 67f in the single direction to open and close the shutter 60. However, the motor 67f may be a motor capable of reverse rotation to move the shutter 60 toward both the open and closed positions.

In the display system of the third embodiment, the control unit 7 controls the shutter unit 6 to move toward the open position according to a command given by the driver when the window 65 of the shutter unit 6 is in the closed state. Thereby, the motor 67f of the shutter unit 6 rotates so that the shutter 60 slides to ward the open position (FIG. 18). Then, the control unit 7 controls the display unit 5 to indicate a camera-taken image supplied from the imaging unit 8b.

The indication beams of the display unit 5 pass through the window 65 of the shutter unit 6 to reach the reflector 4, and the cold mirror 41 of the reflector 4 reflects the indication beams that pass through the opening 11 of the instrument panel 1 to be projected on the projecting area E. When the driver gives a command to cease the image indication, the control unit 7 stops the output of the camera-taken image to the display unit 5 so that the display unit 5 ends the indication. Then, the control unit 7 controls the shutter unit 6 to move toward the closed position. Thereby, the motor 67f of the shutter unit 6 rotates so that the shutter 60 slides toward the closed position (FIG. 16).

As discussed above, the display system of the third embodiment has the shutter unit 6 of which the shutter 60 slides to open the window 65 of the shutter unit 6 when the image indication pattern 3B is selected and to close the window 65 of the shutter unit 6 when the image indication pattern 3B is not selected. This decreases external rays F passing through the opening 11 of the instrument panel 1 to reach the display unit 5 via the reflector 4.

Thus, even when a larger reflector 4 is applied to the display system, external rays F converged on the display unit 5 can be decreased by the shutter unit, preventing a damage of the display unit 5 due to heating thereof.

Moreover, the display system may cooperate with a night vision unit to allow a clear sight for the driver during the night or the like to operate the vehicle safely. In such cases, the image indication pattern 3B is indicated in a larger scale, but external rays F have a smaller luminous energy during the night, so that the larger reflector 4 does not cause a damage of the display unit 5 due to heating thereof.

In addition, the cold mirror 41 of the reflector 4 may be a half mirror that passes almost all of the external rays F delivered through the shutter unit 6, so that the external rays F do not heat up the display unit 5.

In the third embodiment, the operation of the display system has been discussed only with the image indication pattern 3B. However, the display system of the third embodiment may be modified to enable the normal indication pattern 3A that is switched from the image indication pattern 3B like the first and second embodiments.

Figure 19:
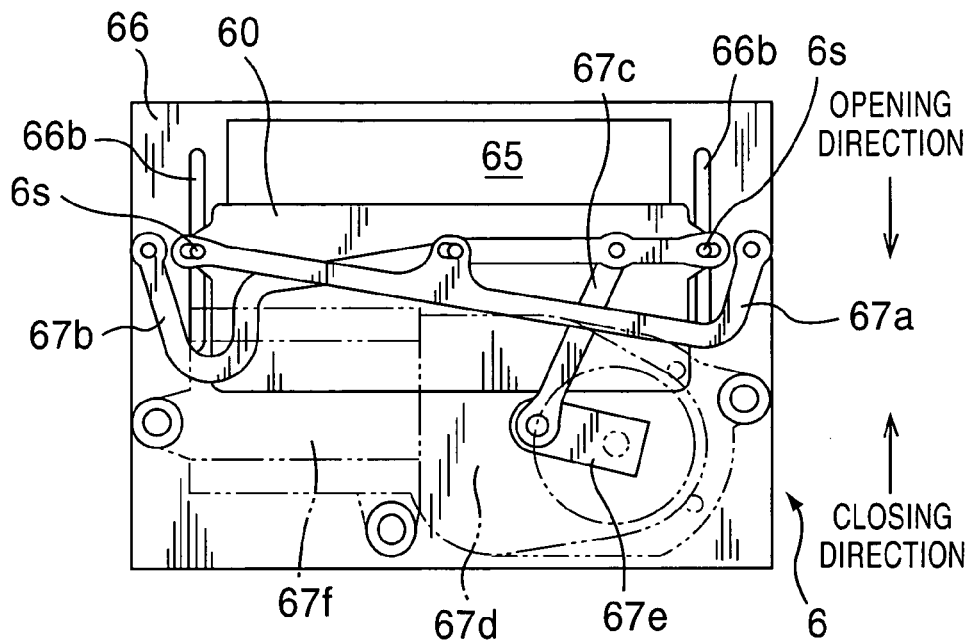
FIG. 19 is a general explanatory view showing a transition state of the shutter unit to close the shutter unit.

For example, the image indication pattern 3B is selected in the open state of the window 65, while the normal indication pattern 3A is selected in a half open state of the window 65 which is shown in FIG. 17 or 19. Because, the normal indication pattern 3A is smaller than the image indication pattern 3B.

Figure 20:
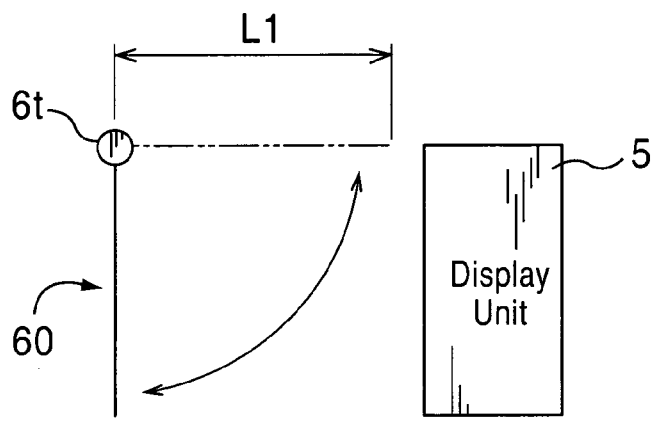
FIG. 20 is a general explanatory view showing an operation to turn a shutter.

Furthermore, the shutter 60 of the shutter unit of the third embodiment is modified in various configurations. FIG. 20 is an explanatory view of a pivotable shutter 60. The shutter 60 is a plate having a length L1 and positioned near a screen of the display unit 5. The shutter 60 turns together with a pivot shaft 6t to provide a window 65 of a shutter unit 6.

Thus, the shutter 60 is turned to a position shown by an imaginary line of FIG. 20 to open the window 65 of the shutter unit 6 when the image indication pattern 3B is selected, and the shutter 60 is turned to another position shown by a solid line of FIG. 20 to close the window 65 of the shutter unit 6 when the image indication pattern 3B is not selected. This prevents external rays F from passing through the opening 11 of the instrument panel 1 to reach the display unit 5 via the reflector 4 as well as the third embodiment.

Figure 21:
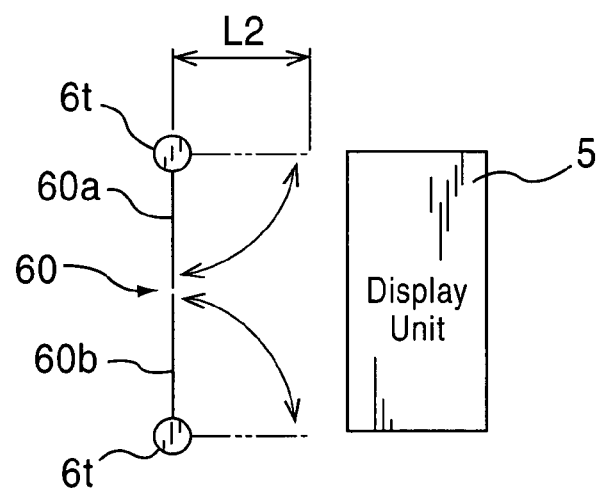
FIG. 21 is a general explanatory view showing an operation to turn a double hinged shutter.

FIG. 21 is an explanatory view of a pivotable shutter 60 of a shutter unit 6. The shutter 60 has a pair of masking walls 60a and 60b each having a length L2 shorter than the length L1. Each masking wall 60a or 60b turns together with a pivot shaft 6t to open the shutter 60 toward each way. This prevents external rays F from passing through the opening 11 of the instrument panel 1 to reach the display unit 5 via the reflector 4 when the shutter unit 6 is not used as well as the third embodiment.

The double-hinged shutter 60 can position the shutter unit 6 nearer to the display unit 5. The shutter 60 may be configured to turn oppositely to display unit 5 to open the indication path to make use of a limited space in the instrument panel 1.

Figures 22A, 22B, 22C:
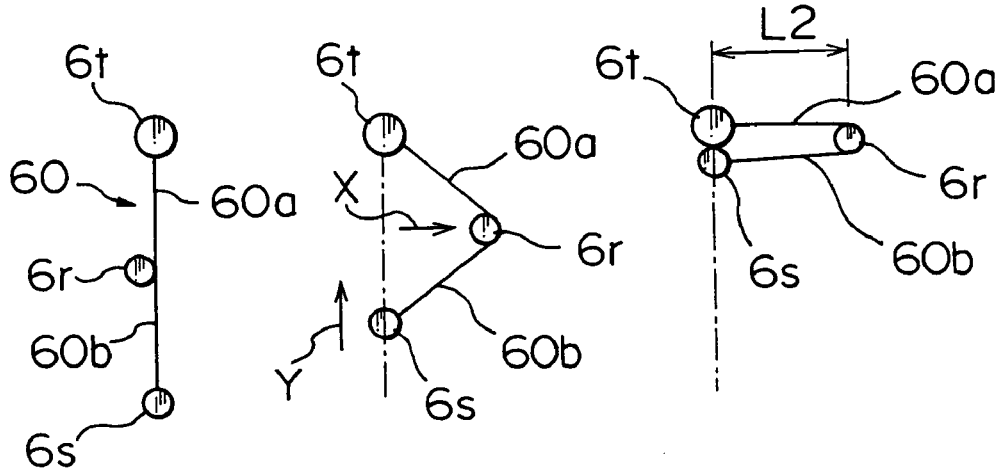
FIGS. 22A, 22B, and 22C each are a general explanatory view showing an operation step to slide a shutter.

The shutter unit 6 may have another shutter 60 which is slidable and foldable. FIGS. 22A, 22B, and 22C are explanatory illustrations of the movement of the shutter 60. The masking walls 60a and 60b are turnably connected to each other by a hinge 6r to define a hinge structure. The masking wall 60a is turnably connected to a pivot shaft 6t at the other end thereof, and the masking wall 60b is turnably connected to a sliding shaft 6s at the other end thereof.

FIG. 22A shows a closed state of the shutter 60. As illustrated in FIG. 22B, the sliding shaft 6s slides in an upward direction and the hinge 6r moves in a right direction X. Then, as illustrated in FIG. 22C, the sliding shaft 6s slides up to the pivot shaft 6t so that the shutter 60 becomes in a folded state. This prevents external rays F from passing through the opening 11 of the instrument panel 1 to reach the display unit 5 via the reflector 4 when the shutter unit 6 is not used as well as the third embodiment.

Figures 23A, 23B, 23C:
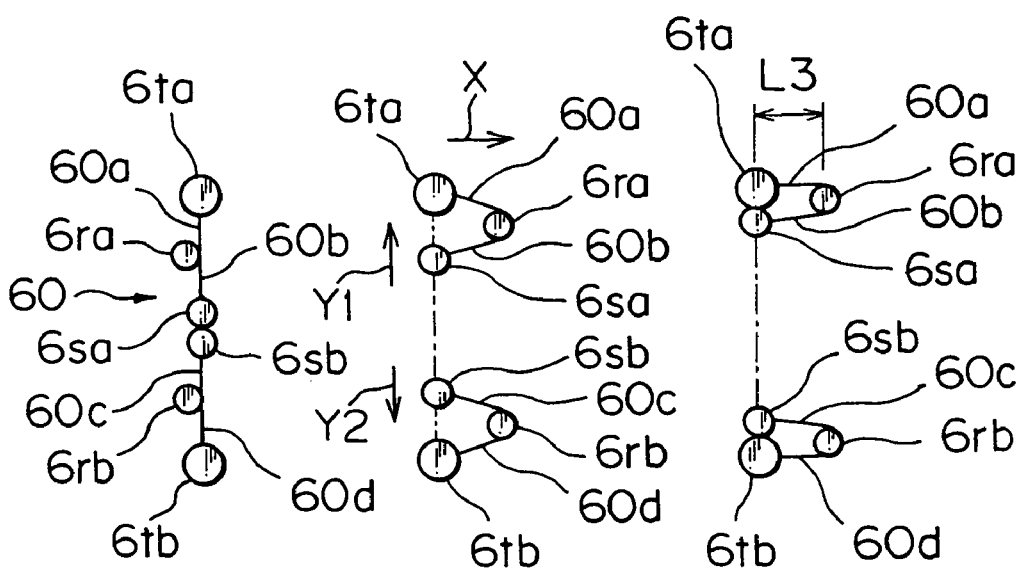
FIGS. 23A, 23B, and 23C each are a general explanatory view showing an operation step to move shutters to each side.

The shutter unit 6 may have further another shutter 60 which is slidable and foldable. FIGS. 23A, 23B, and 23C are explanatory illustrations of the movement of the shutter 60. FIG. 24 is a perspective view for explaining the movement of a sliding shaft of FIG. 24. The shutter 60 slides to each side.

As illustrated in FIGS. 23 and 24, the shutter 60 has a pair of masking walls 60a and 60b and another pair of masking walls 60c and 60d. The pair of masking walls 60a and 60b each having a length L3 are turnably connected to each other by a hinge 6ra, while the pair of masking walls 60c and 60d each having a length L3 are turnably connected to each other by a hinge 6rb. The masking wall 60a is turnably connected to a turning shaft 6ta at the other end thereof, and the masking wall 60d is turnably connected to a turning shaft 6tb at the other end thereof. The masking wall 60b is turnably connected to a sliding shaft 6sa at the other end thereof, and the masking wall 60d is turnably connected to a turning shaft 6tb at the other end thereof.

The sliding shafts 6sa and 6sb each are slidably connected to a guide slit 6b formed in a fixed member. The sliding shafts 6sa and 6sb are moved by a belt 6g driven by a drive shaft 6m. The belt 6g and the drive shaft 6m are positioned in an opposite side of the fixed member relative to the masking walls 60a, 60b, 60c, and 60d.

Figure 24A:
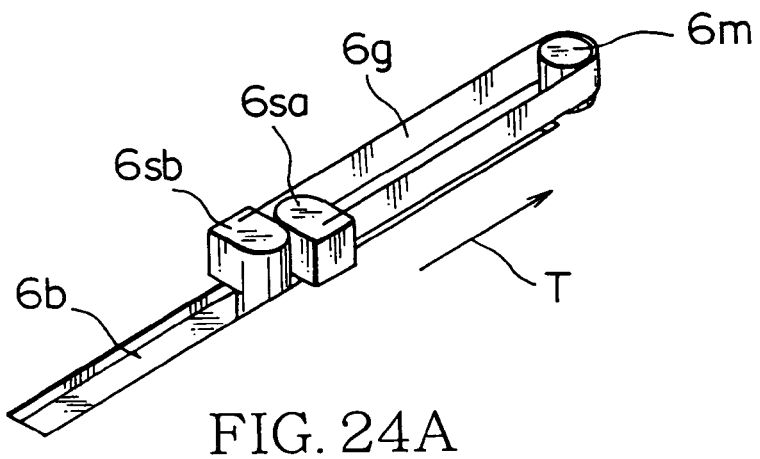
FIGS. 24A and 24B are perspective views showing the movement of a sliding shaft.
Figure 24B:
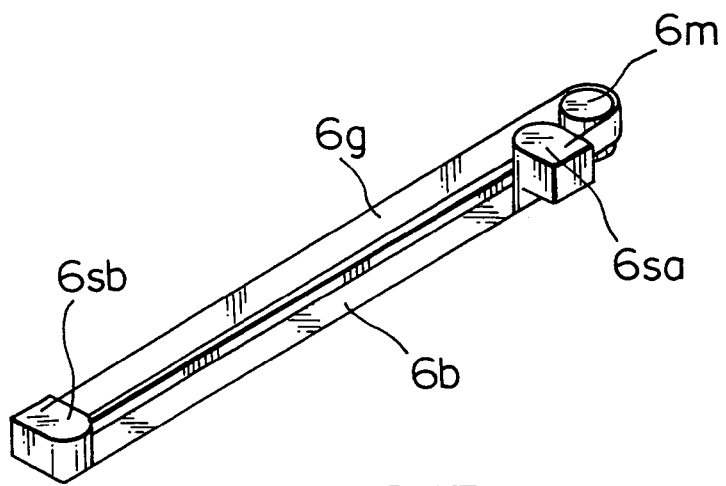

As illustrate in FIGS. 23A and 24A, the drive shaft 6m turns to move the belt 6g in a direction T from a closed state of the shutter 60. Thereby, as illustrated in FIG. 23B, the sliding shaft 6sa moves in an upward direction Y1 and the sliding shaft 6sb moves in a downward direction Y2. The sliding shafts 6sa and 6sb slide up to the turning shaft 6ta or 6tb, so that the shutter 60 becomes in a folded state as illustrated in FIG. 23C.

Thus, this configuration prevents external rays F from passing through the opening 11 of the instrument panel 1 to reach the display unit 5 when the shutter unit 6 is not used as well as the third embodiment. The shutter 60 can modify the window 65 in shape and size in conformity with an indication object. The masking walls 60a, 60b, 60c, and 60d each have the length L3 shorter than the lengths L1 and L2, which can make use of a limited space in the instrument panel 1.

Figures 25A, 25B, 25C:
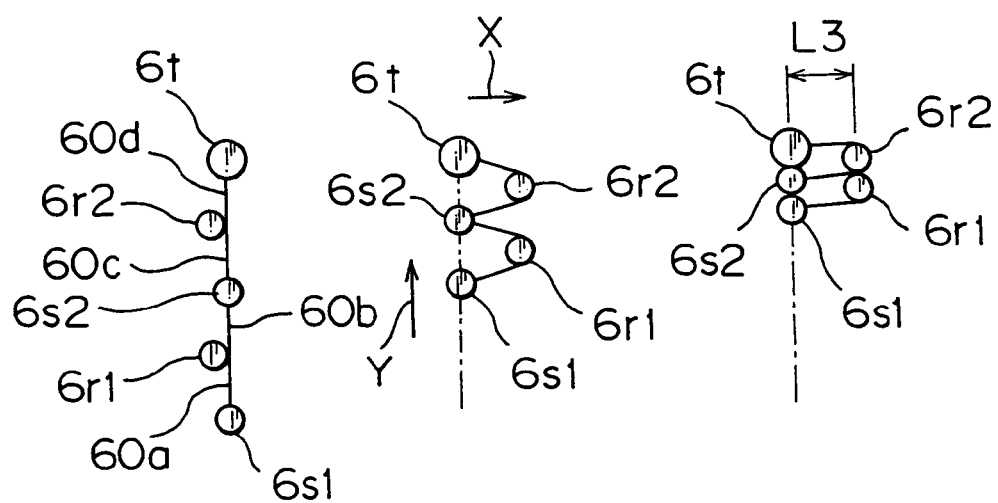
FIGS. 25A, 25B, and 25C each are a general explanatory view showing an operation of slidable and foldable shutters.

The shutter unit 6 may have another shutter 60 provided with a plurality of masking walls which are slidable and foldable. FIGS. 25A, 25B, and 25C are explanatory illustrations of the movement of the shutter 60. The masking walls 60a and 60b are turnably connected to each other by a hinge 6r1, and the masking walls 60c and 60d are turnably connected to each other by a hinge 6r2, to define a pair of hinge structures. The masking wall 60a is turnably connected to a sliding shaft 6s1 at the other end thereof, and the masking wall 60d is turnably connected to a pivot shaft 6t at the other end thereof. The masking walls 60b and 60c are turnably connected to each other by a sliding shaft 6s2 to connect the pair of hinge structures one another.

FIG. 25A shows a closed state of the shutter 60. As illustrated in FIG. 25B, the sliding shaft 6s1 slides in an upward direction Y and the hinge 6r1 moves in the right direction X. Then, as illustrated in FIG. 25C, the hinge 6r1 slides up to the hinge 6r2 so that the hinge 6r2 also moves rightward until the shutter 60 becomes in a folded state. This prevents external rays F from passing through the opening 11 of the instrument panel 1 to reach the display unit 5 when the shutter unit 6 is not used as well as the third embodiment.

Fourth Embodiment

The first to third embodiments each have a single reflector 4. A fourth embodiment of the present invention is a display system having a plurality of reflectors which allow an elongated optical path to indicate a virtual image further apart from a driver's eye. Note that the general configuration of the fourth embodiment is similar to that of the first embodiment. A constitutional element identical with or corresponding to one having been described in the first embodiment is designated by the same reference as in the first embodiment and will not be discussed in detail again.

Figure 26:
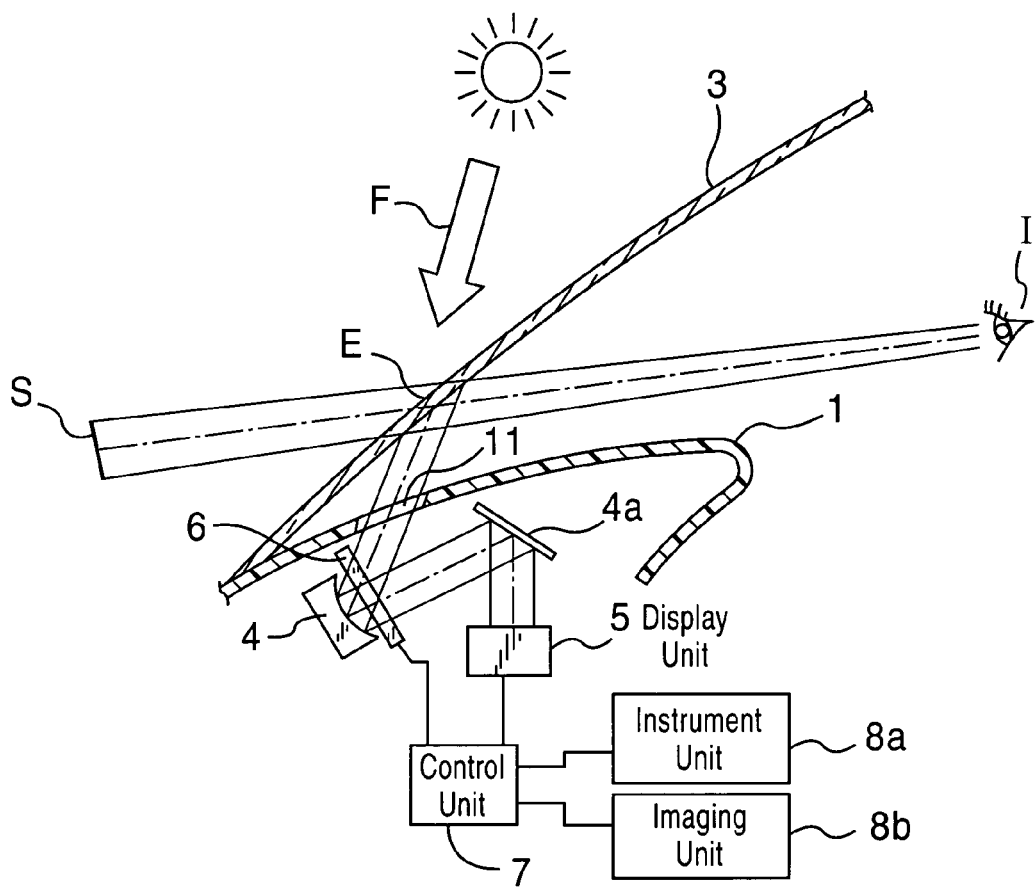
FIG. 26 is a general constitutional view showing a fourth embodiment of a display system according to the present invention.
Figure 31:
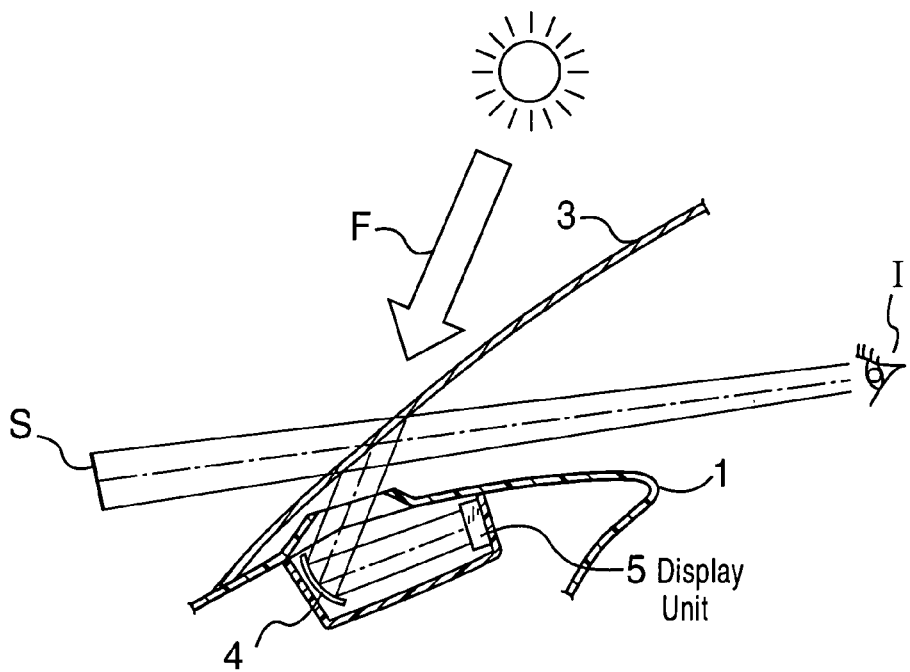
FIG. 31 is a general constitutional view showing a conventional head-up type display system.

FIG. 26 is a general constitutional view showing the fourth embodiment of a display system according to the present invention. The fourth embodiment is different from the first embodiment in that a second reflector 4a is arranged between the reflector 4 and the display unit 5. The reflector 4a is an ordinary mirror (flat mirror) which reflects indication beams emitted from the display unit 5 toward the reflector 4. The indication beams are diverged by the reflector 4 and projected on the projecting area E through the opening 11.

Figure 27:
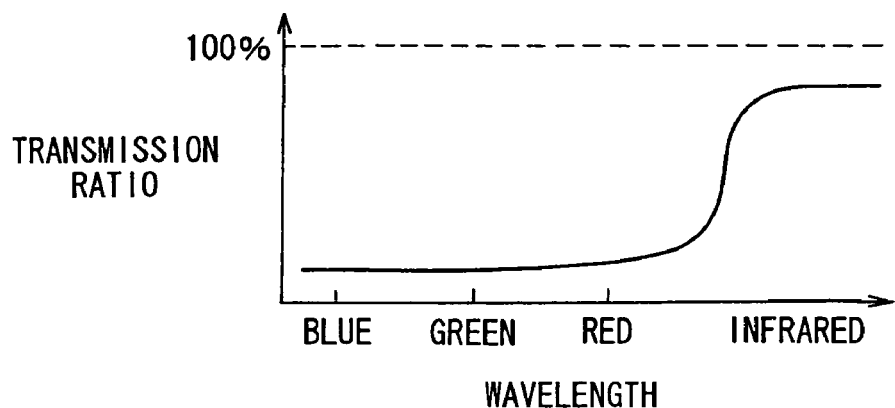
FIG. 27 is a first graph showing a relationship between transmission ratio and wavelength of sun beams.
Figure 28:
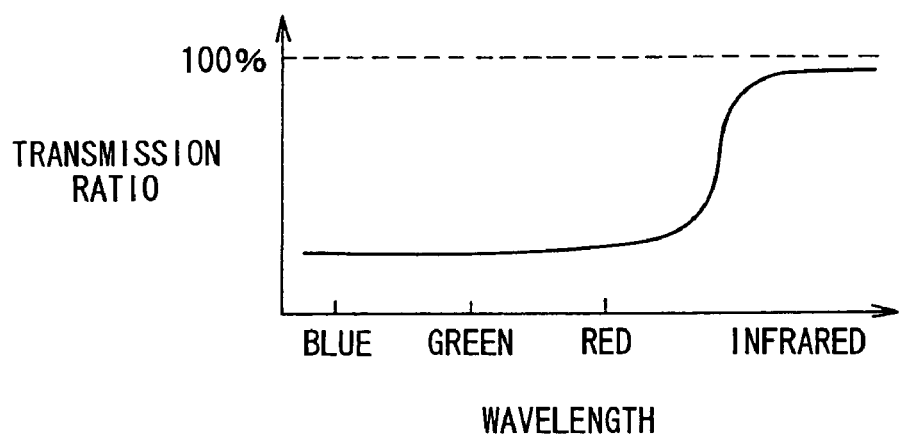
FIG. 28 is a second graph showing a relationship between transmission ratio and wavelength of sun beams.

Each of the reflectors 4 and the 4a is a cold mirror. When external rays F reach the reflector 4 through the opening 11, almost all of infrared rays of the external rays pass through the reflector 4. In relation to the reflector 4, a first graph of FIG. 27 shows a relationship between transmission ratio and wave length of sun beams. Small amounts of infrared rays remain in the external rays which have been reflected by the reflector 4. The reflected rays reach the reflector 4a. Regarding the reflector 4a, a second graph of FIG. 28 shows a relationship between transmission ratio and wave length of the reflected rays.

When T % of infrared rays in the external rays F pass through the reflector 4, 100%−T % of the infrared rays are reflected by the reflector 4 (strictly speaking, absorption and diffusion due to the reflection also should be considered). Thus, $(100\%-T\ \%)^2$ of the infrared rays remain in the external rays after the external rays are reflected by the reflector 4a. The provision of the reflectors 4, 4a each defined by a cold mirror further decreases external infrared rays supplied into the display unit 5. This prevents a damage of the display unit 5 due to heating thereof.

As mentioned above, indication beams supplied from the display unit 5 are reflected sequentially by the reflectors 4a and 4 to be projected on the projecting area E. The reflectors 4 and 4a of the fourth embodiment pass infrared rays and reflect visible rays. Thus, the reflector 4a further decreases the remaining infrared rays in the external rays F which have been reflected by the reflector 4. This surely prevents a damage of the display unit 5 due to heating thereof.

The forth embodiment is provided with the two reflectors 4 and 4a. However, more than two reflectors may be provided to further decrease infrared rays of external rays F which reach the display unit 5.

The shutter unit 6 is positioned near the reflector 4 so as to be opposed to a reflection surface of the cold mirror in the same way as the first embodiment. Thus, the window 65 of the shutter unit 6 can be smaller in the normal indication pattern 3A than in the image indication pattern 3B, so that external rays F coming through the opening 11 of the instrument panel 1 reach less the display unit 5 when the display system is in the normal indication pattern 3A. This surely prevents a damage of the display unit 5 due to heating thereof.

Figure 29:
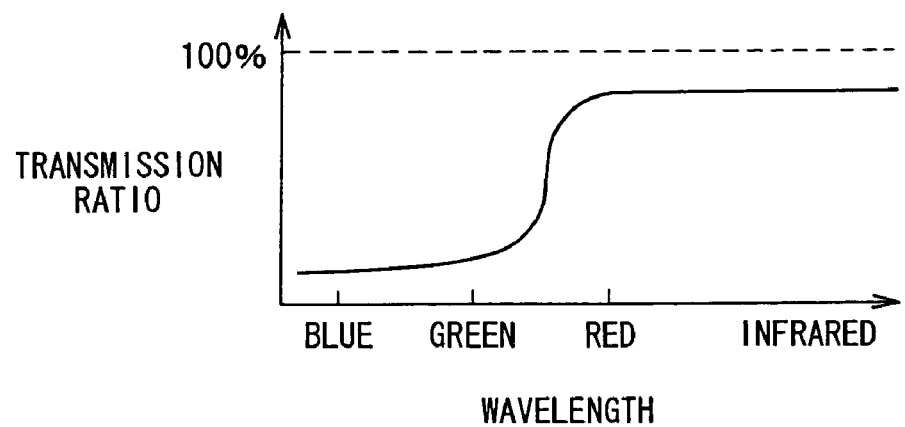
FIG. 29 is a third graph showing a relationship between transmission ratio and wavelength of sun beams.

The cold mirror used for the reflectors 4 and 4a generally cuts infrared rays having a wave length more than 700 nanometers. However, when a head-up display does not require rays having wave lengths longer than green color rays, at least one of the reflectors 4 and 4a will be modified to have a filtering character shown in a third graph of FIG. 29 which shows transmission ratio relative to ray wave length. Such cold mirrors can further decrease infrared rays in the external rays F which would reach the display unit 5.

When the head-up display uses narrow band rays corresponding to a specified color, for example, a green color, at least one of the reflectors 4 and 4a is modified to have a filtering character which surely reflects only the specified color. Thus, the other rays pass through the one of reflectors, decreasing the external rays F which reach the display unit 5.

Figure 30:
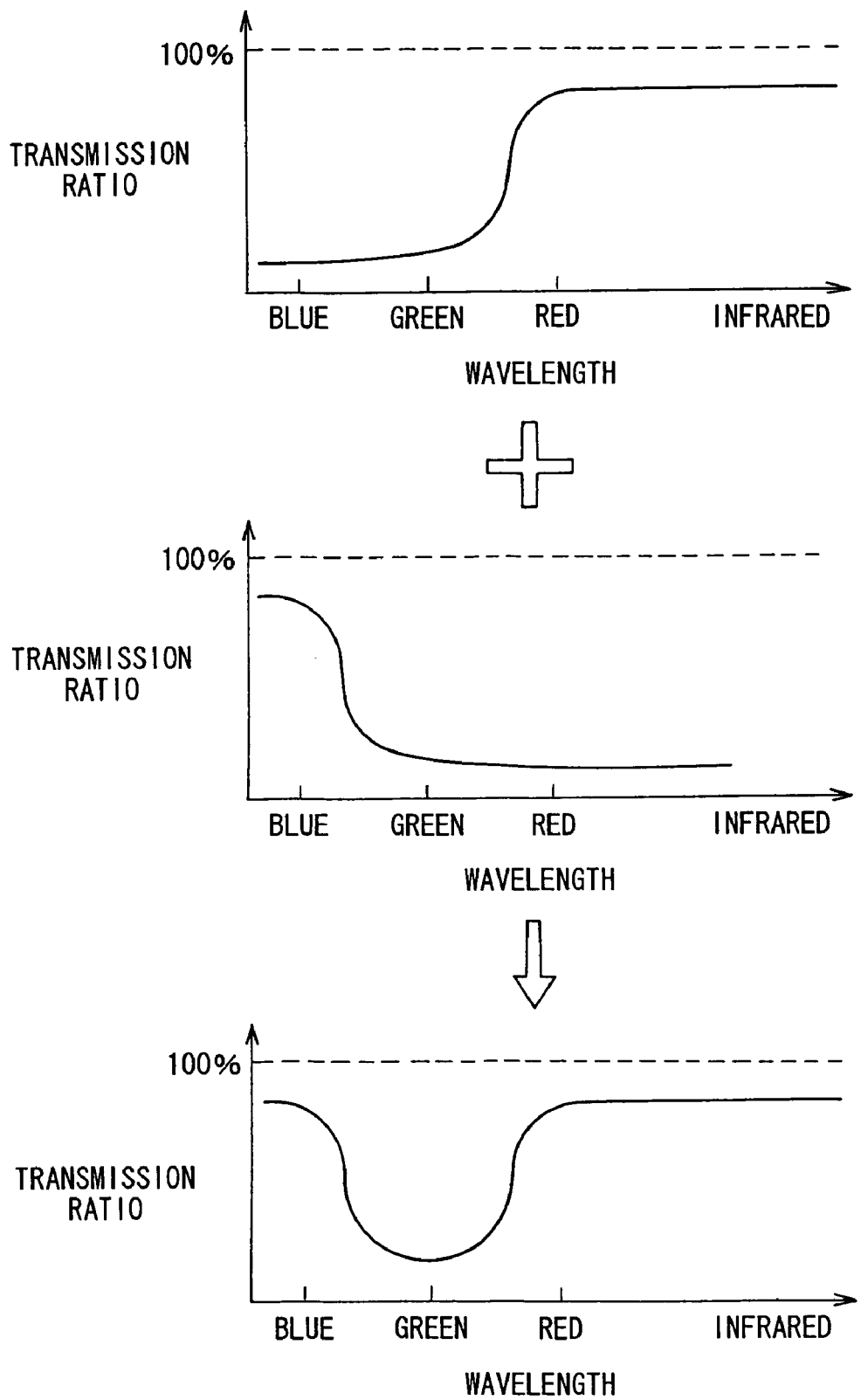
FIG. 30 is graphs each showing a relationship between transmission ratio and wavelength of sun beams.

As illustrated in FIG. 30 showing graphs of a relationship between transmission ratio and wave length of sun beams, a plurality of mirrors may be combined when desired. Each mirror cuts off a wave range different from each other in relation to sun beams.

For example, as shown in FIG. 30, the reflector 4 is modified to have a filtering character to pass rays of a red color and rays having wave lengths longer than the red color. Meanwhile, the reflector 4a is modified to have a filtering character to pass rays of a blue color. Thereby, only green color rays are reflected by the combination of the reflectors 4 and 4a, decreasing the external rays F which reach the display unit 5.

What is claimed is:

1. A display system having a display unit and a reflector which are disposed in an instrument panel of an automotive vehicle, wherein the display unit emits an image, and the image is reflected by the reflector to be projected on a windshield of the vehicle via an opening of the instrument panel, the display system superposing the image on a foreground of a driver's view such that a driver of the vehicle can recognize the superposed image and the foreground via the windshield simultaneously, the display system comprising:

a shutter device disposed between the display unit and the opening, and a control unit for indicating the image such that the image becomes alternatively in a smaller normal indication pattern and in a larger camera-taken image of the foreground, wherein the control unit controls the shutter device to pass indication beams of the emitted image through the opening in conformity with a size of the emitted image.

2. The display system as described in claim 1, wherein the image emitted from the display unit is obtained by an infrared ray camera that takes a foreground seen from the vehicle particularly during the night, and the shutter device is transformable so that the image taken by the infrared ray camera becomes larger than during a normal operation of the display unit.

3. The display system as described in claim 1, wherein the shutter device has a plurality of shutting members to pass the indication beams of the emitted image through the opening in conformity with the size of the emitted image.

4. The display system as described in claim 1, wherein the shutter device is a sliding shutter that opens and closes to pass the indication beams of the emitted image through the opening in conformity with the size of the emitted image.

5. The display system as described in claim 1, wherein the shutter device prevents external rays from reaching the display unit through the opening when the display unit is not in use.

6. The display system as described in claim 1, wherein the shutter device is opposed to a reflection face of the reflector.

7. The display system as described in claim 1, wherein the reflector reflects visible rays and substantially passes infrared rays.

8. The display system as described in claim 1, wherein a plurality of the reflectors are provided across an optical path between the display unit and the opening.

9. The display system as described in claim 7, wherein the reflector primarily reflects a part of the visible rays that corresponds to wavelengths of colors of the image emitted from the display unit.

* * * * *